United States Patent [19]

Nagai

[11] Patent Number: 4,766,545
[45] Date of Patent: * Aug. 23, 1988

[54] SYSTEM FOR CONTROLLING THE IGNITION TIMING OF AN INTERNAL COMBUSTION ENGINE

[75] Inventor: Masaaki Nagai, Fuchu, Japan

[73] Assignee: Fuji Jukogyo Kabushiki Kaisha, Tokyo, Japan

[*] Notice: The portion of the term of this patent subsequent to Nov. 4, 2003 has been disclaimed.

[21] Appl. No.: 813,101

[22] Filed: Dec. 24, 1985

[30] Foreign Application Priority Data

Dec. 28, 1984 [JP] Japan ................................ 59-280559

[51] Int. Cl.[4] ........................... F02P 5/06; F02M 7/00
[52] U.S. Cl. .......................... 364/431.08; 364/431.07; 123/422; 123/425; 123/435; 123/417
[58] Field of Search ..................... 364/431.03, 431.07, 364/431.08, 569; 123/425, 419, 435, 436, 422

[56] References Cited

U.S. PATENT DOCUMENTS

| | | | |
|---|---|---|---|
| 4,351,281 | 9/1982 | Geiger et al. | 123/425 |
| 4,448,163 | 5/1984 | Yoshida | 123/425 |
| 4,620,518 | 11/1986 | Nagai | 123/425 |
| 4,626,997 | 12/1986 | Takeda et al. | 364/431.05 |
| 4,649,888 | 3/1987 | Kawai et al. | 123/609 |

Primary Examiner—Parshotam S. Lall
Assistant Examiner—V. N. Trans
Attorney, Agent, or Firm—Martin A. Farber

[57] ABSTRACT

A system comprises rough correcting operation for roughly correcting the ignition timing to a desired ignition timing, fine correcting operation for finely correcting the roughly corrected ignition timing, and acceleration correcting operation for correcting the roughly corrected ignition timing at the acceleration of the engine.

3 Claims, 10 Drawing Sheets

SYSTEM FOR CONTROLLING THE IGNITION TIMING OF AN INTERNAL COMBUSTION ENGINE

RELATED APPLICATION

U.S. patent application Ser. No. 813,117 now U.S. Pat. No. 4,620,518.

BACKGROUND OF THE INVENTION

The present invention relates to a system for controlling the ignition timing of an internal combustion engine such as an automotive engine.

A learning control system for correcting the ignition timing has been proposed. The control system is adapted to advance the ignition timing so as to produce a maximum torque as long as the level of the engine knock does not exceed a tolerable level. The ignition timing stored in a RAM is corrected by a small correcting quantity (quantity of correction) and converged to a desired value little by little. The correcting quantity for the ignition timing at every updating operation is gradually reduced as the leaving number increases, that is as the ignition timing approaches the desired value.

On the other hand, when engine operating conditions greatly change, the ignition timing deviates from a desired ignition timing. In a conventional ignition timing learning control system, a single program is provided for correcting the ignition timing in acceleration and steady state. Accordingly, it takes a long time to correct the timing.

SUMMARY OF THE INVENTION

The object of the present invention is to provide a system which may quickly correct the ignition timing.

To this end, in the system of the present invention, the correction of the ignition timing comprises a rough correcting operation, fine correcting operation and acceleration state correcting operation.

According to the present invention, there is provided a system for controlling the ignition timing of an internal combustion engine having a microprocessor and an ignition timing control device comprising, first sensing means for sensing operating conditions of the engine at steady state and for producing an acceleration signal, a knock sensor for sensing engine knock and for producing a knock signal. The system further comprises rough correcting means responsive to the engine operating condition signal and to the knock signal for roughly correcting the ignition timing to a desired ignition timing and for producing a completion signal when the correction reaches a complete state, fine correcting means responsive to the completion signal and to the engine operating conditions signal and knock signal for finely correcting the ignition timing determined by the rough correcting means, acceleration correcting means responsive to the acceleration signal and the knock signal for correcting the corrected ignition timing determined by the rough correcting means.

The other objects and features of this invention will become understood from the following description with reference to the accompanying drawings.

DETAILED DESCRIPTION OF THE PREFERRED EMBODIMENT

Figure 1:
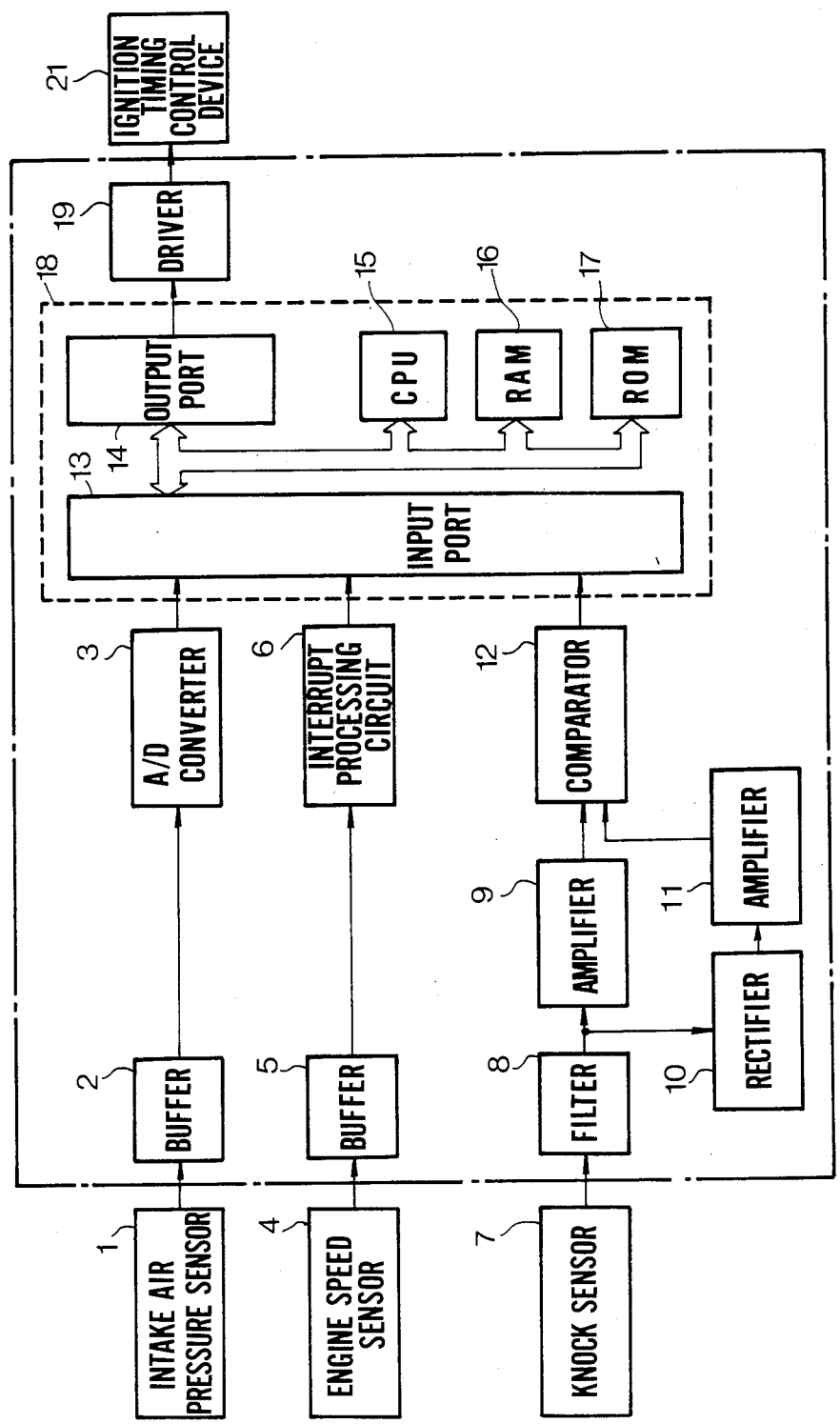
FIG. 1 is a block diagram showing a control system according to the present invention.

Referring to FIG. 1, an intake air pressure (or quantity) sensor 1, engine speed sensor 4 such as a crankangle sensor, and knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and amplifier 9, and, on the other hand, to the comparator 12 through a rectifier 10 and amplifier 11. The comparator 12 compares both inputs and produces an output signal when an engine knocking (hereinafter called knock) having a higher level than a predetermined value occurs. The outputs of the A/D converter 3, circuit 6 and comparator 12 are applied to a microprocessor 18 through an input port 13.

The microprocessor 18 comprises a CPU 15, RAM 16, ROM 17 and output port 14. The output of the microprocessor 18 is applied to an ignition timing control device 21 through a driver 19 so as to control the ignition timing in accordance with the engine operating conditions sensed by the sensors 1, 4 and 7.

Figure 5A:
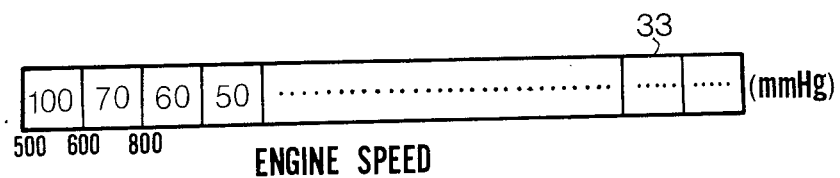
FIGS. 5a to 5c are tables for an acceleration subroutine.
Figure 6:
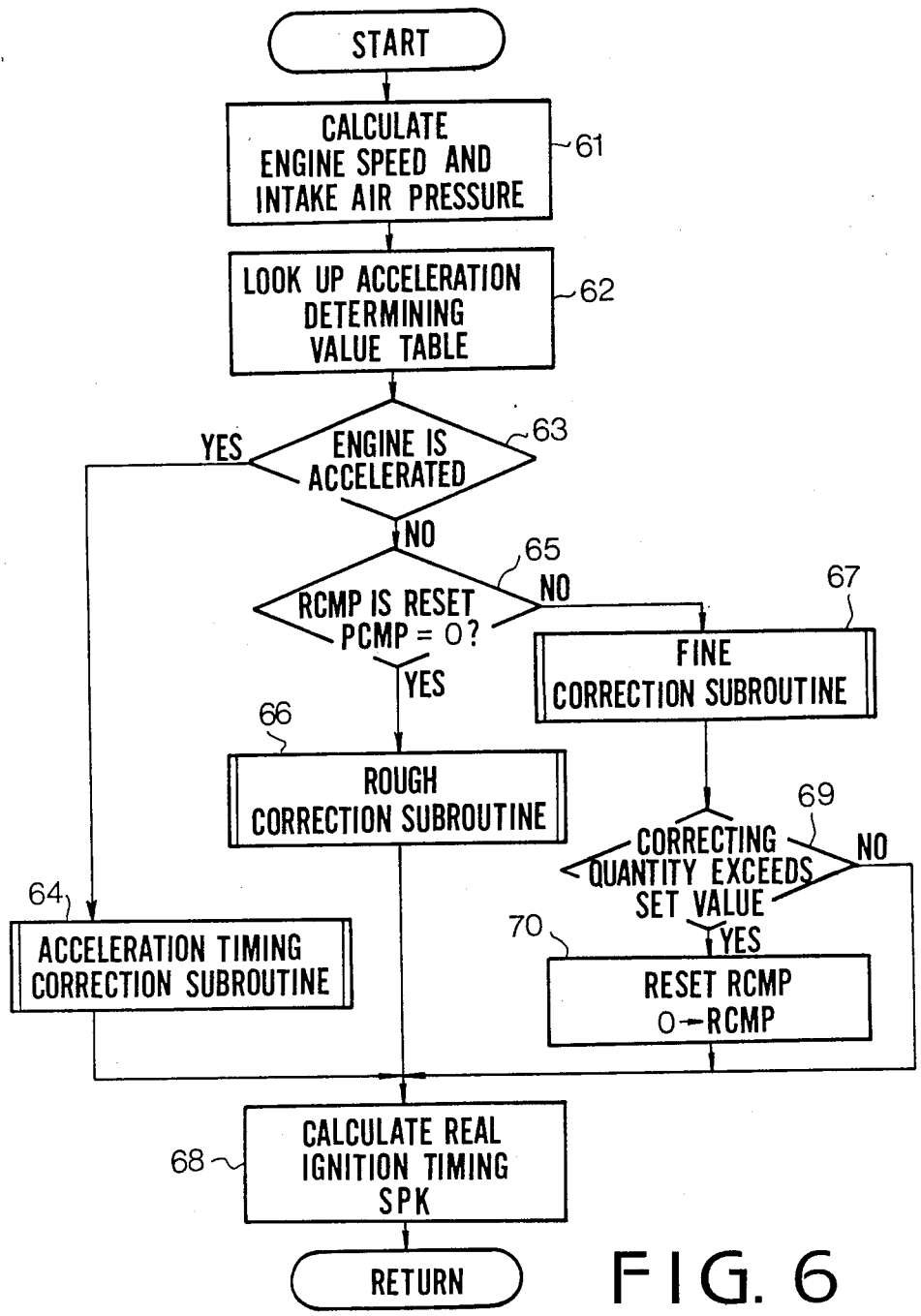
FIGS. 6 to 9b are flowcharts showing the operation of the system.

FIG. 6 shows the operation of the control system in summary. When the program starts, engine speed and intake air pressure are calculated at a step 61, and the difference between the pressures at the program and at the last program. Further, an acceleration determining value at the engine speed is read from an acceleration determining value table 33 of FIG. 5a at a step 62. Thereafter, it is determined, at a step 63, whether the engine is accelerated by comparing the pressure difference with the acceleration determining value read out at step 62. If the difference is larger than the value, it is determined that the engine is accelerated. When the engine is accelerated, the program proceeds to a correction subroutine 64 for acceleration ignition timing. In the subroutine, correcting quantity (quantity of correction) for the acceleration is obtained and stored in the RAM 16.

If the engine is not accelerated, the program proceeds to a step 65, where it is determined whether a rough correction has been executed (whether a rough correction completion flag RCMP is set). In accordance with the decision, rough correction or fine correction is executed in a rough correction subroutine 66 or a fine correction subroutine 67. In the subroutine 66, a basic ignition timing is obtained and the timing is corrected at a step 68 by a correcting quantity obtained in the subroutine 64 or 67, as described hereinafter. If the basic ignition timing obtained in the rough correction subroutine largely deviates from a new desired value by a large disturbance during the fine correcting operation in the subroutine 67, the correcting quantity in the subroutine 67 becomes very large. In such a case, it takes a long time to correct the deviation. Accordingly, if the correcting quantity exceeds a predetermined value at the step 69, the rough correction completion flag RCMP is reset at a step 70, whereby the deviation is quickly corrected in the rough correction subroutine 66.

Figure 2:
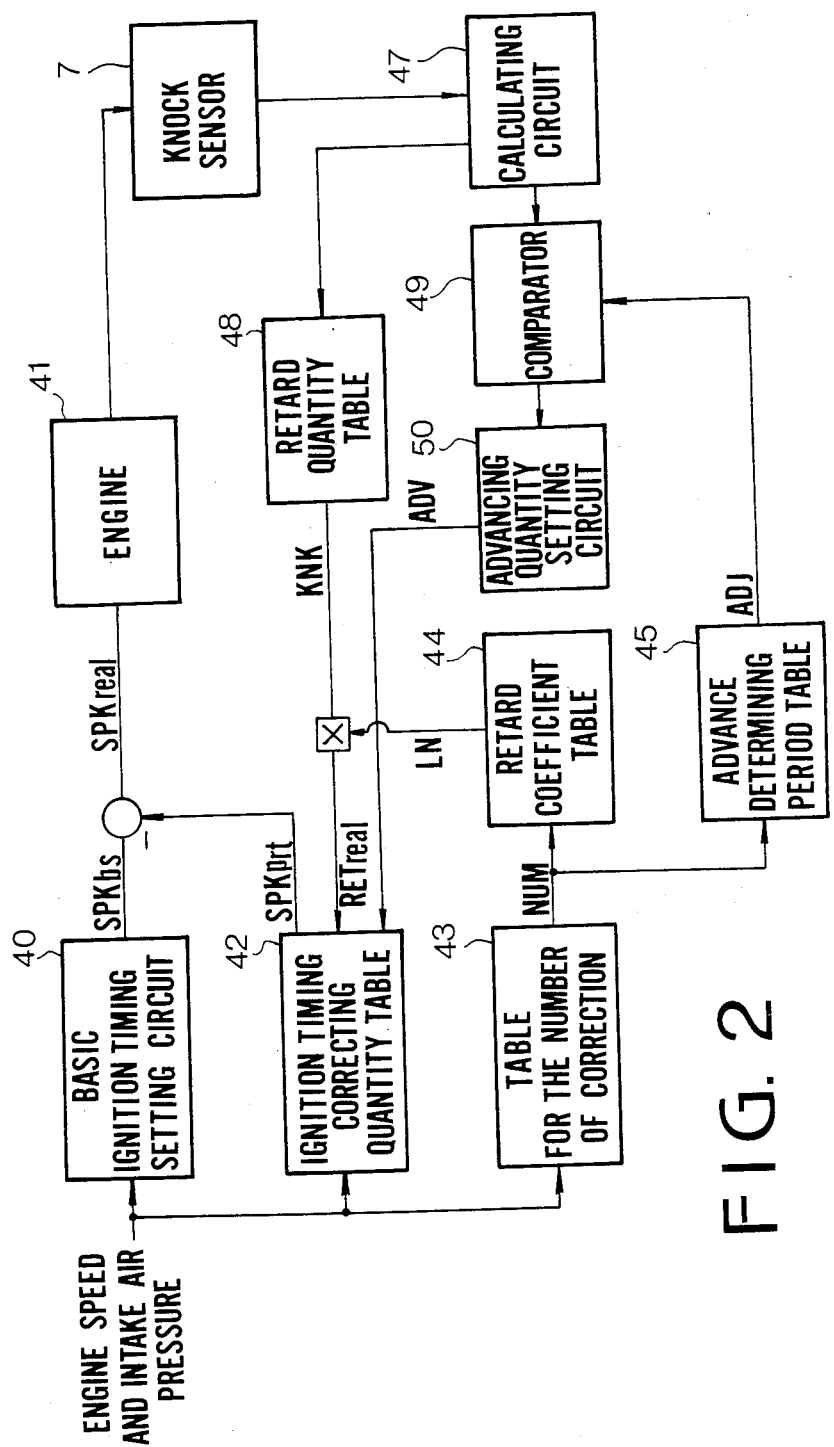
FIG. 2 is a block diagram showing a main part of the control system.
Figure 3A:
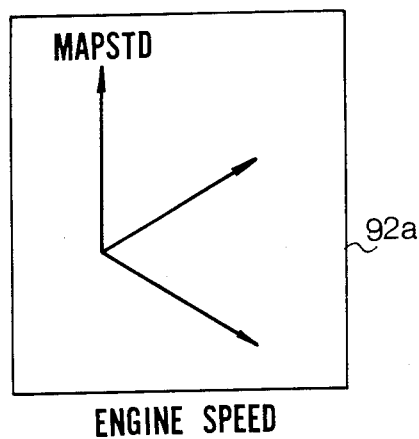
FIGS. 3a and 3b show tables storing a plurality of ignition timings.
Figure 3B:
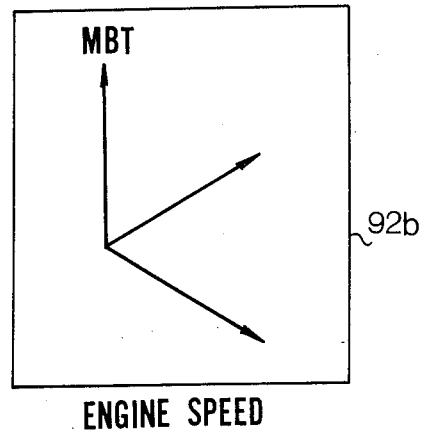
Figure 8:
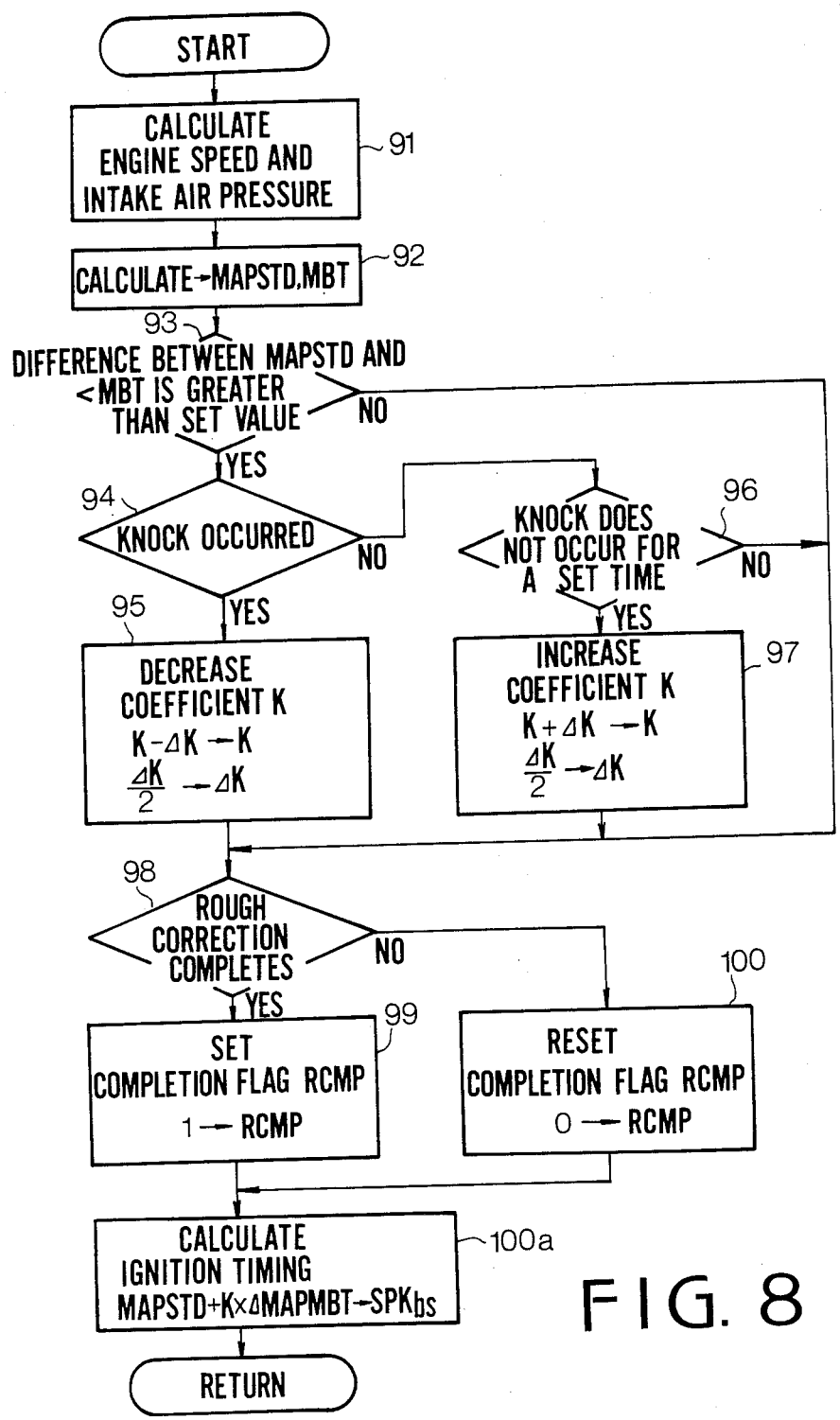

The rough correction is an operation for obtaining a basic ignition timing $SPK_{bs}$ which is calculated in a basic ignition timing setting circuit 40 shown in FIG. 2. FIG. 8 shows the rough correction operation. At a step 91, engine speed and intake air pressure are calculated based on output signals of sensors 1 and 4. Thereafter, at a step 92, a first maximum ignition timing MAPSTD and a second maximum ignition timing MBT are read from tables 92a and 92b (FIGS. 3a, 3b) in the ROM 17, in accordance with the engine speed and intake air pressure. The first maximum ignition timing is a maximum timing for producing maximum torque with low-octane gasoline without the occurrence of knocking and the second maximum ignition timing is a maximum timing for producing maximum torque with high-octane gasoline without the occurrence of knocking.

Figure 4:
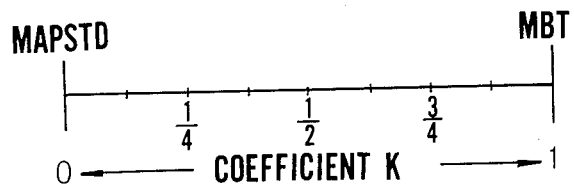
FIG. 4 shows a range of a coefficient K.

In the system, a coefficient K for correcting the ignition timing is provided. The value of the coefficient K is preliminarily set to a value between zero and 1 as shown in FIG. 4.

The coefficient K is stored in the RAM 16 and updated in accordance with engine operating conditions so as to the ignition timing to cause roughly converge to a desired ignition timing. The updating is performed under a predetermined condition and the condition is determined at a step 93. When the difference between the first and second maximum ignition timings read from the tables 92a and 92b is larger than a predetermined degree, for example 5°, the updating is performed. Namely, the program proceeds to a step 94, where it is determined whether knocking has occurred during the program. When the occurrence of knocking is determined, the program proceeds to a step 95, and if not, proceeds to a step 96. At step 95, the coefficient K is decremented by a correcting quantity $\Delta K(\Delta K=K/2)$, and the remainder $K-\Delta K$ is stored in the RAM 16 as a new coefficient for the next updating. Accordingly, the correcting quantity $\Delta K$ at the next updating is $(K-\Delta K)/2$. Namely, the correcting quantity is a half of the coefficient K at updating. More particularly, if the initial coefficient is $\frac{1}{2}$, the correcting quantity is $\frac{1}{4}$, and if it is 0 or 1, the correcting quantity is $\frac{1}{2}$ as seen from FIG. 4.

At the step 96, it is determined whether the engine has operated without knocking occurring for a predetermined period. When knocking does not occur for the period, the coefficient K is incremented by the correcting quantity $\Delta K$ at a step 97.

After the updating of the coefficient K at step 95 or 97, it is determined whether the rough correction is completed at a step 98. As will be understood from the above description, the correcting quantity $\Delta K$ decreases as the number of the correction increases. In the system, when the correcting quantity reaches a predetermined small value, the rough correction is completed. Accordingly, if the quantity $\Delta K$ reaches the predetermined value, a rough correction completion flag RCMP is set at a step 99, and if not, the flag is reset at a step 100. On the other hand, the total correcting quantity $SPK_{prt}$ and the number of correction NUM of the ignition timing are stored in an ignition timing correcting quantity table 42 and a table 43 (FIG. 2) for the number of the correction. At a step 100a, a basic ignition timing $SPK_{bs}$ is calculated by the following formula $$SPK_{bs}=MAPSTD+K\times\Delta MAPMBT \qquad (1)$$

where $\Delta MAPMBT=MBT-MAPSTD$.

The basic ignition timing is applied to an engine 41 (FIG. 2) to operate the engine at the ignition timing. The coefficient K is stored in the RAM 16. If the rough correction is not completed, the coefficient K is updated at the next program so as to cause the ignition timing to roughly converge to a desired ignition timing as described above. It will be understood that if the initial coefficient K is 0, the basic ignition timing $SPK_{bs}$ calculated by the formula (1) is the maximum ignition timing MAPSTD at the first program. The basic ignition timing $SPK_{bs}$ obtained by the rough correction is further corrected by the fine correcting operation as described hereinafter.

Figure 9A:
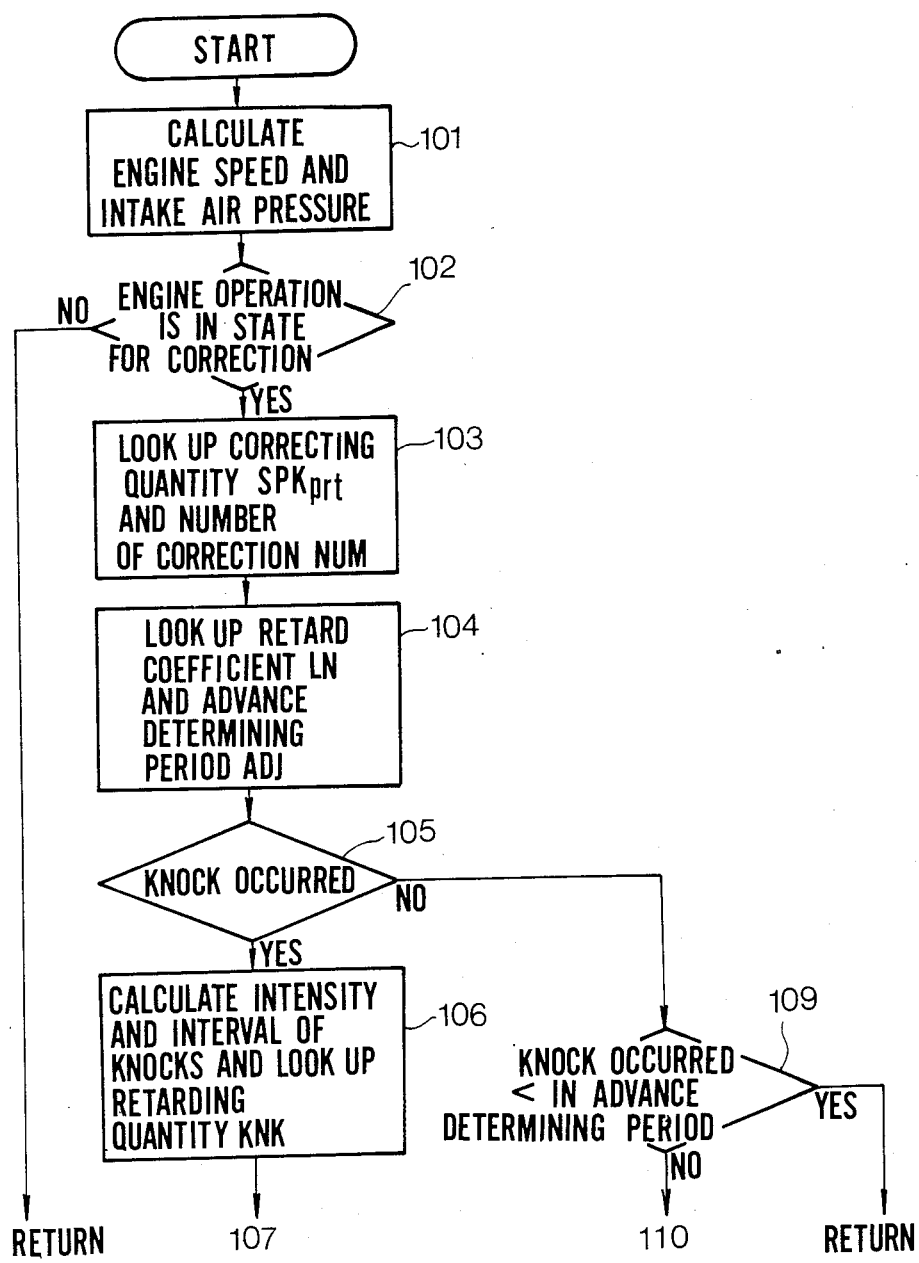
Figure 9B:
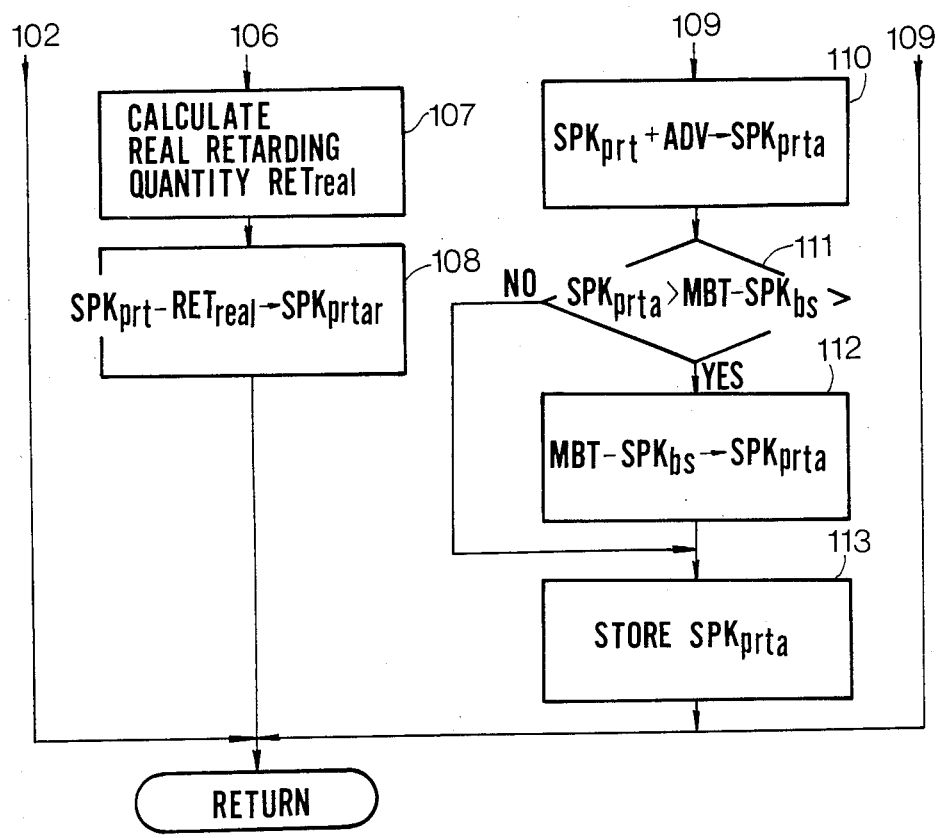
Figure 10A:
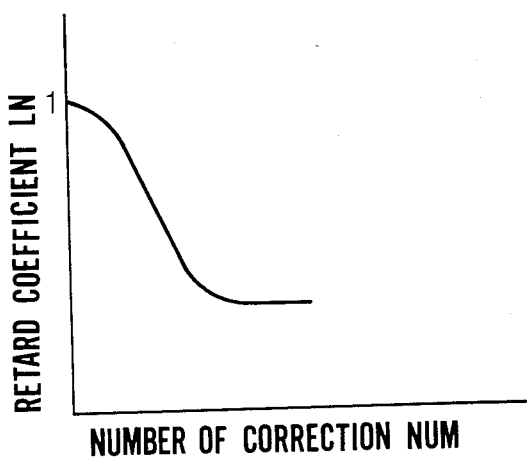
FIGS. 10a and 10b show a retard coefficient table and an advance determining period table, respectively.
Figure 10B:
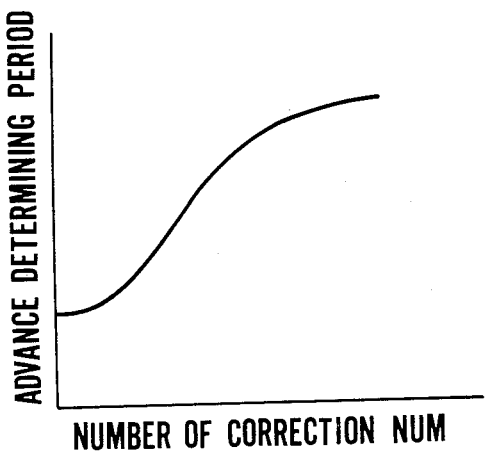

Referring to FIGS. 9a and 9b, at a step 102, it is determined whether the engine operation is in a range which is proper to correct the basic ignition timing $SPK_{bs}$. If it is in the range, the correcting quantity $SPK_{prt}$ and the number of correction NUM are read from tables 42 and 43 at a step 103. Then, at a step 104, a retard coefficient LN for retarding quantity RET is looked up from a retard coefficient table 44 (FIG. 2) of FIG. 10a in accordance with the number of correction NUM, and an advance determining period ADJ is looked up from an advance determining period table 45 (FIG. 2) of FIG. 10b in accordance with the number of correction NUM. Thereafter, the program proceeds to a step 105, where it is determined whether a knock has occurred during the program. When the occurrence of knocking is determined, the program proceeds to a step 106, and if not, it proceeds to a step 109. At step 106, the intensity of the knock and the interval of knocks are calculated at a calculating circuit 47 (FIG. 2), and then, retarding quantity KNK is looked up from a retarding quantity table 48 in accordance with the intensity and the interval of the knocking. At a step 107, a real retarding quantity $RET_{real}$ is calculated by multiplying the retarding quantity KNK and retard coefficient LN together ($RET_{real}=KNK\times LN$). Thereafter, the program proceeds to a step 108, where the correcting quantity $SPK_{prt}$ stored in the table 42 is subtracted with the real retarding quantity $RET_{real}$ to obtain a new correcting quantity $SPK_{prtr}$ which is stored in the table 42.

On the other hand, at the step 109, it is determined whether a knock occurred in the advance determining period ADJ, which is performed at a comparator 49 in FIG. 2. When knocking does not occur in the period, the program proceeds to a step 110, where an advancing quantity ADV of a constant small value is added to the correcting quantity $SPK_{prt}$ to obtain a new correcting quantity $SPK_{prta}$ which is performed in an advancing quantity setting circuit 50 in FIG. 2 and stored in the table 42. Thereafter, at a step 111, it is determined whether the new correcting quantity $SPK_{prta}$ is larger than a limit value which is obtained by subtracting the basic ignition timing $SPK_{bs}$ from the maximum ignition timing MBT ($MBT-SPK_{bs}$). When the new correcting quantity $SPK_{prta}$ is smaller than the limit value, the new correcting quantity is stored in the table 42 at a step 113. If it is larger than the limit value, value of $MBT-SPK_{bs}$ is used as a new correcting quantity (at step 113) and stored in the table 42. $SPK_{prta}$ or $SPK_{prtr}$ is added to the basic ignition timing $SPK_{bs}$ at step 68.

Figure 5B:
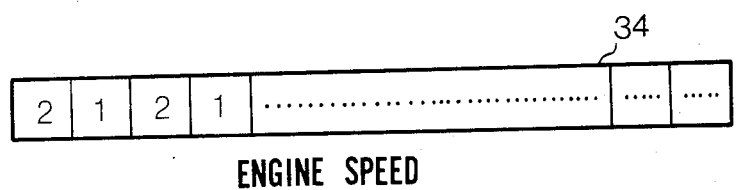
Figure 5C:
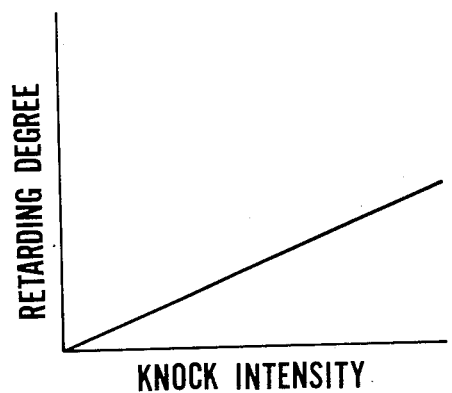
Figure 7:
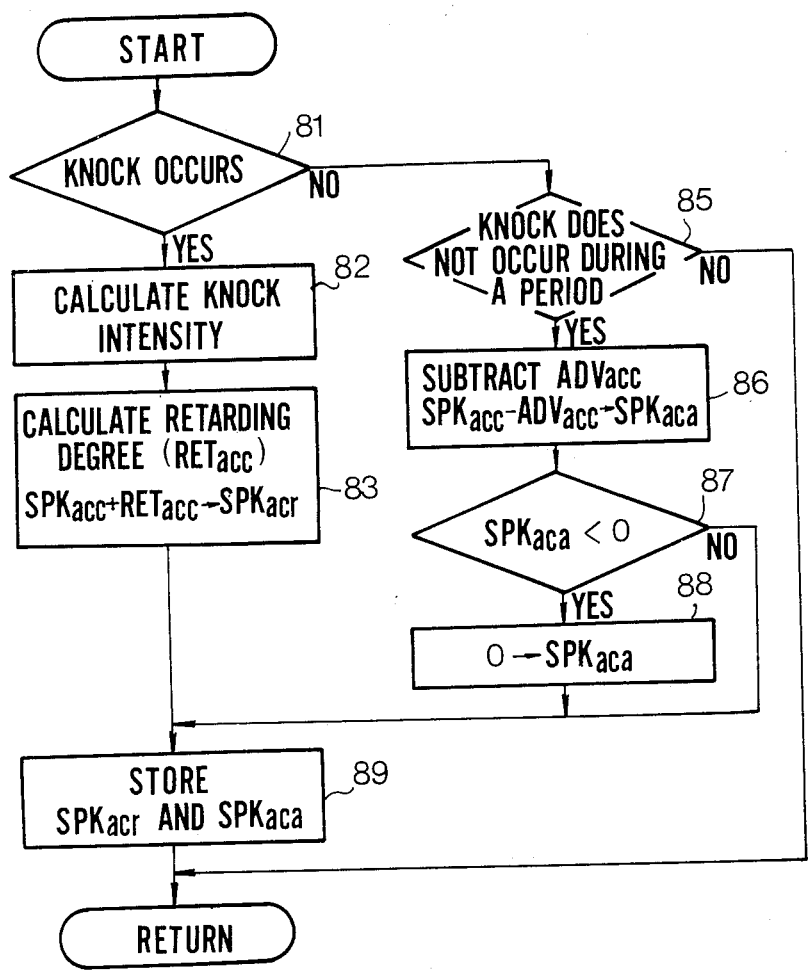

Explaining the operation in the subroutine 64 for acceleration with reference to FIG. 7, occurrence of engine knock is determined at a step 81. When knocking occurs, the intensity of the knocking is calculated at a step 82. In accordance with the intensity, regarding degree $RET_{ac}$ of the ignition timing is looked up from a table of FIG. 5c at a step 83. On the other hand, correcting degree $SPK_{ac}$ is looked up from a table 34 of FIG. 5b in accordance with the engine speed, and the retarding degree $RET_{ac}$ and the correcting degree $SPK_{ac}$ are added to produce a correcting quantity $SPK_{acr}$. The correcting quantity $SPK_{ac}$ is stored in the RAM 16 at a step 89 for correcting the basic ignition timing obtained in the subroutine 66.

If knocking does not occur, it is determined whether knocking does not occur during a predetermined period at a step 85. It is does not occur, the program proceeds to a step 86 where a predetermined advancing degree $ADV_{ac}$ is subtracted from the correcting degree $SPK_{ac}$ ($SRK_{ac} - ADV_{ac}$) to obtain a correcting quantity $SPK_{aca}$. Thereafter, the program proceeds to a step 87, where it is determined whether the correcting quantity $SPK_{ac}$ is negative. If the $SPK_{aca}$ is negative, the value of $SPK_{aca}$ is set to zero at step 88. The value is stored in the RAM 16 at the step 89. The stored value $SPK_{acr}$ or $SPK_{aca}$ is added to the basic ignition timing $SPK_{bs}$ at step 68 (FIG. 6) to obtain a real ignition timing SPK. The data stored in the table 34 (FIG. 5b) is rewritten with the value $SPK_{aca}$ or $SPK_{acr}$ for the next correction.

In accordance with the invention, since the correction of ignition timing is divided into the rough correcting operation, fine correcting operation and correcting operation at acceleration of the engine, it is possible to quickly and finely correct the timing by selectively adding a large correcting quantity and a small correcting quantity.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling the ignition timing of an internal combustion engine having a microprocessor and an ignition timing control device comprising:

first sensing means for sensing operating conditions of the engine at steady state and for producing an engine operating condition signal;

second sensing means for sensing the acceleration of the engine and for producing an acceleration signal;

a knock sensor for sensing engine knock and for producing a knock signal;

rough correcting means responsive to the engine operation condition signal and to the knock signal for roughly correcting the ignition timing to a desired ignition timing and for producing a completion signal when the correction reaches a complete state;

fine correcting means responsive to the completion signal and to the engine operation condition signal and knock signal for finely correcting the ignition timing decided by the rough correcting means;

acceleration correcting means responsive to the acceleration signal and the knock signal for correcting the corrected ignition timing decided by the rough correcting means.

2. The system according to claim 1 wherein the rough correcting means includes means for producing a basic ignition timing and the fine and acceleration correcting means operate to correct the basic ignition timing.

3. The system according to claim 2 wherein the fine correcting means responds to the intensity of the knock and the period in which knock does not occur.

* * * * *